Dec. 27, 1927.

F. ERDMANN

ILLUMINATED LEVEL

Filed Feb. 18, 1926

1,654,248

INVENTOR:
Friedrich Erdmann
By Richards & Geier
Attys.

Patented Dec. 27, 1927.

1,654,248

UNITED STATES PATENT OFFICE.

FRIEDRICH ERDMANN, OF HAMBURG, GERMANY.

ILLUMINATED LEVEL.

Application filed February 18, 1926, Serial No. 89,061, and in Germany May 16, 1925.

The present invention relates to level vials of levels used in building construction and as used on power vehicles, railways, aircraft and so forth for determining upward and downward inclines, descents, etc. When such levels are required for use in the dark, it has hitherto been necessary to illuminate the levels from the outside in order to enable the air bubble in the level to be seen. Such illumination, however, is inconvenient and frequently causes considerable difficulties, especially in connection with locomotives, aircraft and the like. These disadvantages are remedied by the present invention by illuminating the level itself from the interior.

In order to ascertain more accurately the position of the air bubble in the level either the source of light is contained in the level or the level itself is provided with a series of colored bands so as to aid in ascertaining the position of the bubble. This is of importance more particularly in connection with locomotives where the level must be arranged fairly towards the middle of the vehicle and at some distance from the driver's position. If the air bubble is clearly visible in different colors then the driver will know at once whether he is travelling on a level track or on a grade.

In the accompanying drawing are illustrated two forms of construction of the subject of the invention.

Figure 1:
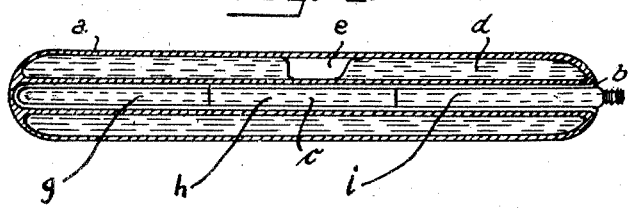
Figure 1 shows a longitudinal section of a level with the source of light inserted.

In the form of construction shown in Figure 1, the body of the level vial $a$ is provided in its center and longitudinally of its length with a compartment forming a hollow space $b$ closed at one end. Into this hollow space $b$ is fitted an incandescent lamp $c$ which is divided into three different colored bands $g$, $h$, $i$, for example, red, white and green, and provided with graduations. The level vial $a$ is filled with an opaque liquid $d$. If the air bubble $e$ is, for example, at the middle of the level vial and the center section of the lamp is white, the body of the level vial at the point where the bubble is located will be illuminated and appear white.

Figure 2:
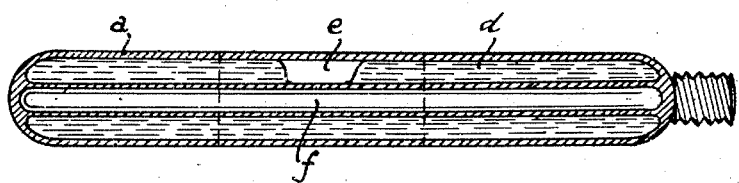
Figure 2 shows a section of a level provided in the center with a hollow space forming a source of light.

In the form of construction according to Figure 2, the level vial $a$ is also filled with an opaque liquid. Extending through the center and along the length of the level vial there is provided a compartment forming a completely closed hollow space $f$ which is directly constructed as an incandescent lamp. If now the walls of the hollow space $f$ are provided with colored marks and graduations, or the outer wall of the level vial is marked in this manner, the air bubble $e$ will permit of the projection of light from the lamp through the same and the body of the level vial will be illuminated and be of a color corresponding to that of the section of the wall opposite which said bubble is located.

It will be understood that the lamp or level vial may be marked with any kind and number of colors which may be found effective in readily distinguishing the bubble.

What I claim is:

A level vial including a body of transparent material, an opaque liquid therein in which there is formed a bubble, said body having an elongated compartment extending for substantially the entire length of the body closed at one end and open at the other end of the body, an incandescent lamp insertable into said compartment through said open end and extending for the entire length of said compartment, said lamp having sections thereof marked with different colors to illuminate the body of said level vial only through said bubble and to thereby impart to said body the color corresponding to the section of the lamp opposite said bubble.

In testimony whereof I have affixed my signature.

FRIEDRICH ERDMANN.